(12) United States Patent
Wang et al.

(10) Patent No.: US 12,209,151 B1
(45) Date of Patent: Jan. 28, 2025

(54) UV CURABLE RESIN FOR PRODUCING ARTIFICIAL DEW AND PREPARATION METHOD THEREOF

(71) Applicant: Meizhu Wang, Huizhou (CN)

(72) Inventors: Meizhu Wang, Huizhou (CN); Juhui Tang, Dazhou (CN)

(73) Assignee: Meizhu Wang, Huizhou (CN)

( * ) Notice: Subject to any disclaimer, the term of this patent is extended or adjusted under 35 U.S.C. 154(b) by 0 days.

(21) Appl. No.: 18/743,271

(22) Filed: Jun. 14, 2024

(30) Foreign Application Priority Data

May 28, 2024 (CN) .......................... 202410676052.4

(51) Int. Cl.
| | |
|---|---|
| *C08F 2/46* | (2006.01) |
| *C08F 2/50* | (2006.01) |
| *C08F 222/10* | (2006.01) |
| *C08G 61/04* | (2006.01) |
| *C08K 3/22* | (2006.01) |
| *C08K 3/36* | (2006.01) |
| *C08K 5/10* | (2006.01) |
| *C08K 5/132* | (2006.01) |

(52) U.S. Cl.
CPC .......... *C08F 2/50* (2013.01); *C08F 222/1065* (2020.02); *C08F 222/1067* (2020.02); *C08K 3/22* (2013.01); *C08K 3/36* (2013.01); *C08K 5/10* (2013.01); *C08K 5/132* (2013.01); *C08K 2003/2241* (2013.01); *C08K 2201/011* (2013.01)

(58) Field of Classification Search
CPC ............... C08F 2/46; C08F 2/50; C08G 61/04
USPC ................. 522/33, 6, 189, 184, 71, 1; 520/1
See application file for complete search history.

(56) References Cited

FOREIGN PATENT DOCUMENTS

WO    WO-2015004566 A2 *   1/2015   ............ C07F 9/5337

* cited by examiner

*Primary Examiner* — Jessica Whiteley
(74) *Attorney, Agent, or Firm* — JEEN IP LAW, LLC

(57) ABSTRACT

A UV curable resin for producing artificial dew and a preparation method thereof, the UV curable resin includes epoxy acrylate, urethane acrylate, 2-hydroxy-methylphenyl-propane-1-one, methyl phenyl glyoxylate, thickening agent, defoaming agent, polymerization inhibitor, and filler; compared to AB two-component epoxy resin, the present disclosure has lower requirements for use environment, and can flexibly adjust curing time and speed by precisely controlling intensity and illumination time of UV light source, thereby significantly reducing material loss and operational difficulty; besides, due to a faster solidification process, the present disclosure does not require a large drying area, thus production efficiency and space utilization are improved; the present disclosure uses epoxy acrylate and urethane acrylate as base resins, which renders the artificial dew have good transparency and glossiness, thereby effectively improving a simulation degree of the artificial dew, and rendering the simulated plant products more ornamental and attractive.

10 Claims, 1 Drawing Sheet

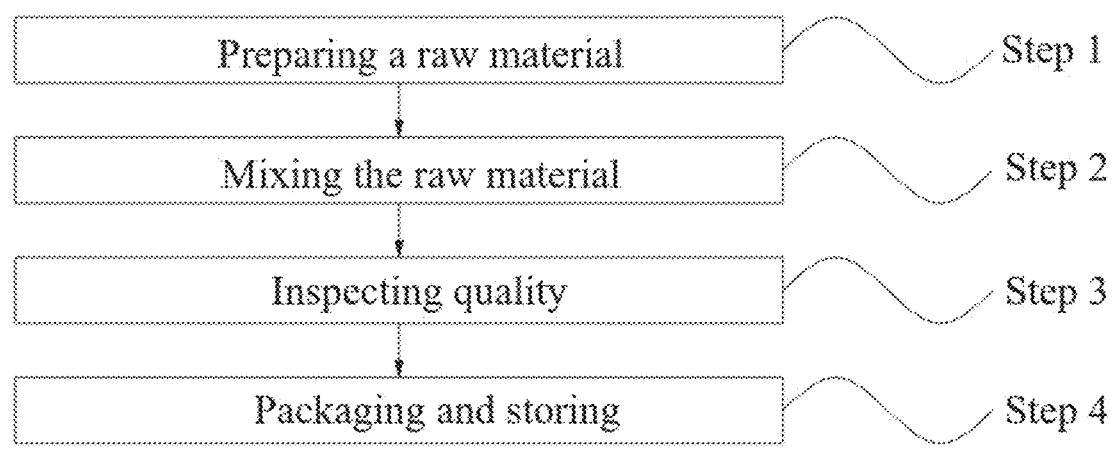

1

UV CURABLE RESIN FOR PRODUCING ARTIFICIAL DEW AND PREPARATION METHOD THEREOF

CROSS-REFERENCE TO RELATED APPLICATIONS

This application claims priority to Chinese Patent Application No. 202410676052.4, filed on May 28, 2024, which is hereby incorporated by reference in its entirety.

TECHNICAL FIELD

The present disclosure relates to the field of UV curable resin technologies, and in particular, to a UV curable resin for producing artificial dew and a preparation method thereof.

BACKGROUND

Dewdrop glue, as a specialized adhesive that gives realistic dewdrop effects to simulated plants, can be used to decorate simulated green plants, simulated fruits and melons, simulated silk flowers, hay, Christmas trees, and other handicrafts. The current market mainly uses AB two-component epoxy resin as a core component. However, this epoxy resin exhibits several significant limitations in practical applications: firstly, its operating time window is extremely narrow. Once the resin curing agent is added and thoroughly stirred, it must be used within a strict period of 2 to 4 hours, otherwise the resin will fail, which undoubtedly increases the urgency and difficulty of operation. Secondly, there is a high requirement for an accuracy of manual operation, and the strict material ratio renders construction difficult, and it is easy to increase a rework rate due to improper operation. Furthermore, epoxy resin has strict requirements for its use environment, including dust-free, ventilated, temperature of 5-35° C., humidity of 50%-70%, and other conditions. If these requirements cannot be met, dewdrops will appear white and not dry completely, which will lead to an increase in product failure rate. In addition, the drying speed is slow and up to 24 hours are needed to fully dry, which not only affects production efficiency but also increases a required working space. Furthermore, the manufacturing process of AB two-component epoxy resin results in significant material loss and generates a large amount of industrial waste, thereby increasing the manufacturing cost. Finally, from a simulation effect, it can be seen that this adhesive has not yet achieved 65% of natural dew effect, and its realism needs to be further improved.

SUMMARY

The purpose of the present disclosure is to provide a UV curing resin for producing artificial dew and a preparation method thereof, in order to solve the problems proposed in the background technology.

To achieve the above objectives, the present disclosure provides the following technical solution: a UV curable resin for producing artificial dew, including: epoxy acrylate, urethane acrylate, 2-hydroxy-methylphenylpropane-1-one, methyl phenyl glyoxylate, thickening agent, defoaming agent, polymerization inhibitor, and filler, where mass percentages of each component are 30-40% of epoxy acrylate, 35-45% of urethane acrylate, 1-2% of 2-hydroxy-methylphenylpropane-1-one, 1.5-2.5% of methyl phenyl glyoxylate, 4-6% of thickening agent, 0.3-0.7% of defoaming agent, 0.7-1.3% of polymerization inhibitor, and 13-17% of filler, respectively.

In an embodiment of the present disclosure, the mass percentages of each component are: 35% of epoxy acrylate, 40% of urethane acrylate, 1.5% of 2-hydroxymethylphenylpropane-1-one, 2% of methyl phenyl glyoxylate, 5% of thickening agent, 0.5% of defoaming agent, 1% of polymerization inhibitor, and 15% of filler, respectively.

In an embodiment of the present disclosure, the thickening agent is an organosilicon thickening agent, the defoaming agent is an organosilicon defoaming agent, and the polymerization inhibitor is hydroquinone.

In an embodiment of the present disclosure, the filler is nano titanium dioxide and nano silicon dioxide.

In an embodiment of the present disclosure, the mass percentages of each component in the filler are 25-35% of nano titanium dioxide and 65-75% of nano silicon dioxide, respectively.

In an embodiment of the present disclosure, the mass percentages of each component in the filler are 30% of nano titanium dioxide and 70% of nano silicon dioxide, respectively.

A preparation method of UV curing resin for producing artificial dew, including step 1: preparing a raw material; step 2: mixing the raw material; step 3: inspecting quality; step 4: packaging and storing;

- in step 1, epoxy acrylate, urethane acrylate, 2-hydroxymethylphenylpropane-1-one, methyl phenyl glyoxylate, thickening agent, defoaming agent, polymerization inhibitor, and filler were weighted according to mass ratio;
- in step 2, the weighted epoxy acrylate and urethane acrylate in step 1 were pre-mixed, then 2-hydroxymethylphenylpropane-1-one, methyl phenyl glyoxylate, thickening agent, defoaming agent, polymerization inhibitor, and filler were added sequentially to a stirring vessel to mix and stir, the UV curing resin was obtained after stirring evenly;
- in step 3, the UV curing resin prepared in step 2 was conducted a performance test;
- in step 4, the UV curing resin that passed the test in step 3 was taken, packaged, and stored in a sealed manner.

In an embodiment of the present disclosure, in step 2, a temperature of pre-mixing is 80-90° C., a time for stirring is 10-30 minutes, and a speed for stirring is 200-500 r/min.

In an embodiment of the present disclosure, in step 2, a temperature for mixing and stirring is 25-30° C., the time for stirring is 20-30 minutes, and the speed for stirring is 400-600 r/min.

In an embodiment of the present disclosure, in step 3, the performance test includes a viscosity test, curing rate, hardness test, and weather resistance test.

Compared with existing technology, the beneficial effect of the present disclosure is that compared to AB two-component epoxy resin, the present disclosure has lower requirements for use environment, and can flexibly adjust curing time and speed by precisely controlling intensity and illumination time of UV light source, thereby significantly reducing material loss and operational difficulty; besides, due to a faster solidification process, the present disclosure does not require a large drying area, further improving production efficiency and space utilization. The present disclosure uses epoxy acrylate and urethane acrylate as base resins, which renders the artificial dew have good transparency and glossiness, effectively improving a simulation degree of the artificial dew, and rendering the simulated plant products more ornamental and attractive.

BRIEF DESCRIPTION OF DRAWINGS

FIG. 1 is a flowchart of a method of the present disclosure.

DESCRIPTION OF EMBODIMENTS

The following will provide a clear and complete description of the technical solution in the embodiments of the present disclosure, in combination with the accompanying drawings. Obviously, the described embodiments are only a part of the embodiments of the present disclosure, not all of them. Based on the embodiments in the present disclosure, all other embodiments obtained by those skilled in the art without creative work fall within the protection scope of the present disclosure.

Please refer to FIG. 1, a technical solution provided by the present disclosure:

Example 1

A UV curable resin for producing artificial dew, including epoxy acrylate, urethane acrylate, 2-hydroxymethylphenyl-propane-1-one, methyl phenyl glyoxylate, thickening agent, defoaming agent, polymerization inhibitor, and filler. Mass percentages of each component are 35% of epoxy acrylate, 40% of urethane acrylate, 1.5% of 2-hydroxymethylphenyl-propane-1-one, 2% of methyl phenyl glyoxylate, 5% of thickening agent, 0.5% of defoaming agent, 1% of polymerization inhibitor, and 15% of filler, respectively. The thickening agent is an organosilicon thickening agent, the defoaming agent is an organosilicon defoaming agent, and the polymerization inhibitor is hydroquinone, the filler is nano titanium dioxide and nano silicon dioxide. Mass percentages of each component in the filler are 30% of nano titanium dioxide and 70% of nano silicon dioxide, respectively.

A preparation method of UV curing resin for producing artificial dew, including step 1: preparing a raw material; step 2: mixing the raw material; step 3: inspecting quality; step 4: packaging and storing.

In step 1, epoxy acrylate, urethane acrylate, 2-hydroxymethylphenylpropane-1-one, methyl phenyl glyoxylate, thickening agent, defoaming agent, polymerization inhibitor, and filler are weighed according to mass ratio.

In step 2, the weighted epoxy acrylate and urethane acrylate in step 1 were pr-mixed, and then 2-hydroxymethylphenylpropane-1-one, methyl phenyl glyoxylate, thickening agent, defoaming agent, polymerization inhibitor, and filler were sequentially added to a stirring vessel for mixing and stirring. After stirring evenly, the UV curing resin was obtained; where, a temperature for pre-mixing is 80-90° C., a time for stirring is 10-30 minutes, and a speed for stirring is 200-500 r/min; a temperature for mixing and stirring is 25-30° C., the time for stirring is 20-30 minutes, and the speed for stirring is 400-600 r/min.

In step 3, the UV curing resin prepared in step 2 was conducted a performance test. Where the performance test includes a viscosity test, a curing speed test, a hardness test, and a weather resistance test.

In step 4, the UV curing resin that passed the test in step 3 was taken, packaged, and store in a sealed manner.

Example 2

A UV curable resin for producing artificial dew, including epoxy acrylate, urethane acrylate, 2-hydroxymethylphenyl-propane-1-one, methyl phenyl glyoxylate, thickening agent, defoaming agent, polymerization inhibitor, and filler. The mass percentages of each component are 35% of epoxy acrylate, 40% of urethane acrylate, 1.8% of 2-hydroxymethylphenylpropane-1-one, 2.5% of methyl phenyl glyoxylate, 6% of thickening agent, 0.5% of defoaming agent, 1.2% of polymerization inhibitor, and 13% of filler, respectively; the thickening agent is an organosilicon thickening agent, the defoaming agent is an organosilicon defoaming agent, and the polymerization inhibitor is hydroquinone; the filler is nano titanium dioxide and nano silicon dioxide; the mass percentages of each component in the filler are 30% of nano titanium dioxide and 70% of nano silicon dioxide, and the in preparation method is the same as Example 1.

Example 3

A UV curable resin for producing artificial dew, including epoxy acrylate, urethane acrylate, 2-hydroxymethylphenyl-propane-1-one, methyl phenyl glyoxylate, thickening agent, defoaming agent, polymerization inhibitor, and filler. The mass percentages of each component are 35% of epoxy acrylate, 42% of urethane acrylate, 1.7% of 2-hydroxymethylphenylpropane-1-one, 2.5% of methyl phenyl glyoxylate, 4.5% of thickening agent, 0.3% of defoaming agent, 1% of polymerization inhibitor, and 13% of filler, respectively; the thickening agent is an organosilicon thickening agent, the defoaming agent is an organosilicon defoaming agent, and the polymerization inhibitor is hydroquinone; the filler is nano titanium dioxide and nano silicon dioxide. The mass percentages of each component in the filler are 30% of nano titanium dioxide and 70% of nano silicon dioxide, and the preparation method is the same as Example 1.

Example 4

A UV curable resin for producing artificial dew, including epoxy acrylate, urethane acrylate, 2-hydroxymethylphenyl-propane-1-one, methyl phenyl glyoxylate, thickening agent, defoaming agent, polymerization inhibitor, and filler. The mass percentages of each component are 33% of epoxy acrylate, 40% of urethane acrylate, 1% of 2-hydroxymethylphenylpropane-1-one, 2% of methyl phenyl glyoxylate, 6% of thickening agent, 0.7% of defoaming agent, 1.3% of polymerization inhibitor, and 16% of filler, respectively. The thickening agent is an organosilicon thickening agent, the defoaming agent is an organosilicon defoaming agent, and the polymerization inhibitor is hydroquinone; the filler is nano titanium dioxide and nano silicon dioxide; the mass percentages of each component in the filler are 30% of nano titanium dioxide and 70% of nano silicon dioxide, and the preparation method is the same as Example 1.

Example 5

A UV curable resin for producing artificial dew, including epoxy acrylate, urethane acrylate, 2-hydroxymethylphenyl-propane-1-one, methyl phenyl glyoxylate, thickening agent, defoaming agent, polymerization inhibitor, and filler. The mass percentages of each component are 34% of epoxy acrylate, 40% of urethane acrylate, 1% of 2-hydroxymethylphenylpropane-1-one, 2.5% of methyl phenyl glyoxylate, 5% of thickening agent, 0.5% of defoaming agent, 1% of polymerization inhibitor, and 16% of filler, respectively. The thickening agent is an organosilicon thickening agent, the defoaming agent is an organosilicon defoaming agent, and the polymerization inhibitor is hydroquinone, the filler is nano titanium dioxide and nano silicon dioxide. The mass percentages each component in the filler are 30% of nano titanium dioxide and 70% of nano silicon dioxide, and the preparation method is the same as Example 1.

Example 6

A UV curable resin for producing artificial dew, including epoxy acrylate, urethane acrylate, 2-hydroxymethylphenylpropane-1-one, methyl phenyl glyoxylate, thickening agent, defoaming agent, polymerization inhibitor, and filler. The mass percentages each component are 35% of epoxy acrylate, 40% of urethane acrylate, 1% of 2-hydroxymethylphenylpropane-1-one, 2% of methyl phenyl glyoxylate, 4% of thickening agent, 0.3% of defoaming agent, 0.7% of polymerization inhibitor, and 17% of filler, respectively. The thickening agent is an organosilicon thickening agent, the defoaming agent is an organosilicon defoaming agent, and the polymerization inhibitor is hydroquinone; the filler is nano titanium dioxide and nano silicon dioxide; the mass percentages of each component in the filler are 30% nano titanium dioxide and 70% nano silicon dioxide, and the preparation method is the same as Example 1.

Example 7

A UV curable resin for producing artificial dew, including epoxy acrylate, urethane acrylate, 2-hydroxymethylphenylpropane-1-one, methyl phenyl glyoxylate, thickening agent, defoaming agent, polymerization inhibitor, and filler. The mass percentages of each component are 33% of epoxy acrylate, 40% of urethane acrylate, 1.4% of 2-hydroxymethylphenylpropane-1-one, 2% of methyl phenyl glyoxylate, 5% of thickening agent, 0.3% of defoaming agent, 1.3% of polymerization inhibitor, and 17% of filler, respectively. The thickening agent is an organosilicon thickening agent, the defoaming agent is an organosilicon defoaming agent, and the polymerization inhibitor is hydroquinone; the filler is nano titanium dioxide and nano silicon dioxide, mass percentages of each component in the filler are 30% of nano titanium dioxide and 70% of nano silicon dioxide, and the preparation method is the same as Example 1.

The comparison of the properties of each example is shown in table 1 below:

TABLE 1

| | Example 1 | Example 2 | Example 3 | Example 4 | Example 5 | Example 6 | Example 7 |
|---|---|---|---|---|---|---|---|
| Epoxy acrylate/% | 35 | 35 | 35 | 33 | 34 | 35 | 33 |
| Urethane acrylate/% | 40 | 40 | 42 | 40 | 40 | 40 | 40 |
| 2-hydroxy-methylphenylpropane-1-one/% | 1.5 | 1.8 | 1.7 | 1 | 1 | 1 | 1.4 |
| Methyl phenyl glyoxylate/% | 2 | 2.5 | 2.5 | 2 | 2.5 | 2 | 2 |
| Thickening agent/% | 5 | 6 | 4.5 | 6 | 5 | 4 | 5 |
| Defoaming agent/% | 0.5 | 0.5 | 0.3 | 0.7 | 0.5 | 0.3 | 0.3 |
| Polymerization inhibitor/% | 1 | 1.2 | 1 | 1.3 | 1 | 0.7 | 1.3 |
| Filler/% | 15 | 13 | 13 | 16 | 16 | 17 | 17 |
| Property | Balanced hardness and flexibility, resistant to high and low temperatures, friction, and yellowing | Balanced hardness and flexibility, resistant to high and low temperatures, friction, and yellowing | Balanced hardness and flexibility, resistant to high and low temperatures, friction, and yellowing | Balanced hardness and flexibility, resistant to high and low temperatures, friction, and yellowing | Balanced hardness and flexibility, resistant to high and low temperatures, friction, and yellowing | Balanced hardness and flexibility, resistant to high and low temperatures, friction, and yellowing | Balanced hardness and flexibility, resistant to high and low temperatures, friction, and yellowing |
| UV curing speed | Moderate | Quick | Quick | Moderate | Moderate | Moderate | Moderate |
| Simulation degree of dew/% | 76 | 72 | 72 | 75 | 75 | 71 | 74 |

Based on the above, the advantages of the present disclosure are that the epoxy acrylate in the present disclosure has high hardness, good gloss, corrosion resistance, and heat resistance, while the urethane acrylate has excellent flexibility, low temperature resistance, adhesion, wear resistance, and weather resistance. The use of a mixture of the two as the base resin achieves a good balance in product performance; 2-hydroxy-methylphenylpropane-1-one and methyl phenyl glyoxylate are used as initiators, the product has high initiation efficiency. At the same time, 2-hydroxy-methylphenylpropane-1-one has the characteristics of low odor and low pollution, while methyl phenyl glyoxylate has good thermal stability and low yellowing ability, rendering the product environmentally friendly and pollution-free, and has good weather resistance; by using nano titanium dioxide and nano silica as the filler, the adding amount of resin can be reduced, and the cost can be saved. The UV curing resin produced by the present disclosure can not only control the curing time and curing speed, but also have good transparency and glossiness after curing. Therefore, it can be used to produce high simulation degree of artificial dew, rendering simulated plant products more ornamental.

For those skilled in the art, it is obvious that the present disclosure is not limited to the details of the exemplary examples mentioned above, and can be implemented in other specific forms without departing from the spirit or basic features of the present disclosure. Therefore, from any perspective, the examples should be regarded as exemplary and non-restrictive, and the scope of the present disclosure is limited by the accompanying claims rather than the above description. Therefore, it is intended to encompass all variations that fall within the meaning and scope of equivalent elements of the claims within the present disclosure. Any accompanying drawings in the claims should not be regarded as limiting the claims involved.

What is claimed is:

1. A UV curable resin for producing artificial dew, comprising: epoxy acrylate, urethane acrylate, 2-hydroxy-methylphenylpropane-1-one, methyl phenyl glyoxylate, thickening agent, defoaming agent, polymerization inhibitor, and filler,
   wherein mass percentages of each component are 30-40% of epoxy acrylate, 35-45% of urethane acrylate, 1-2% of 2-hydroxy-methylphenylpropane-1-one, 1.5-2.5% of methyl phenyl glyoxylate, 4-6% of thickening agent, 0.3-0.7% of defoaming agent, 0.7-1.3% of polymerization inhibitor, and 13-17% of filler, respectively.

2. The UV curable resin for producing artificial dew as claimed in claim 1, wherein the mass percentages of each component are: 35% of epoxy acrylate, 40% of urethane acrylate, 1.5% of 2-hydroxymethylphenylpropane-1-one, 2% of methyl phenyl glyoxylate, 5% of thickening agent, 0.5% of defoaming agent, 1% of polymerization inhibitor, and 15% of filler, respectively.

3. The UV curable resin for producing artificial dew as claimed in claim 1, wherein the thickening agent is an organosilicon thickening agent, the defoaming agent is an organosilicon defoaming agent, and the polymerization inhibitor is hydroquinone.

4. The UV curable resin for producing artificial dew as claimed in claim 1, wherein the filler is nano titanium dioxide and nano silicon dioxide.

5. The UV curable resin for producing artificial dew as claimed in claim 4, wherein the mass percentages of each component in the filler are 25-35% of nano titanium dioxide and 65-75% of nano silicon dioxide, respectively.

6. The UV curable resin for producing artificial dew as claimed in claim 5, wherein the mass percentages of each component in the filler are 30% of nano titanium dioxide and 70% of nano silicon dioxide, respectively.

7. A preparation method of UV curing resin for producing artificial dew, comprising:
   step 1: preparing a raw material;
   step 2: mixing the raw material;
   step 3: inspecting quality;
   step 4: packaging and storing;
   in step 1, epoxy acrylate, urethane acrylate, 2-hydroxy-methylphenylpropane-1-one, methyl phenyl glyoxylate, thickening agent, defoaming agent, polymerization inhibitor, and filler were weighted according to the mass percentages as claimed in claim 1;
   in step 2, the weighted epoxy acrylate and urethane acrylate in step 1 were pre-mixed, then 2-hydroxy-methylphenylpropane-1-one, methyl phenyl glyoxylate, thickening agent, defoaming agent, polymerization inhibitor, and filler were added sequentially to a stirring vessel to mix and stir, the UV curing resin was obtained after stirring evenly;
   in step 3, the UV curing resin prepared in step 2 was conducted a performance test;
   in step 4, the UV curing resin that passed the test in step 3 was taken, packaged, and stored in a sealed manner.

8. The preparation method of UV curing resin for producing artificial dew as claimed in claim 7, wherein in step 2, a temperature of pre-mixing is 80-90° C., a time for stirring is 10-30 minutes, and a speed for stirring is 200-500 r/min.

9. The preparation method of UV curing resin for producing artificial dew as claimed in claim 7, wherein in step 2, a temperature for mixing and stirring is 25-30° C., the time for stirring is 20-30 minutes, and the speed for stirring is 400-600 r/min.

10. The preparation method of UV curing resin for producing artificial dew as claimed in claim 7, wherein in step 3, the performance test comprises a viscosity test, curing rate, hardness test, and weather resistance test.

* * * * *